(12) United States Patent
Mattelet et al.

(10) Patent No.: US 10,988,402 B2
(45) Date of Patent: Apr. 27, 2021

(54) TRIM ELEMENT FOR INTERIOR VEHICLE

(71) Applicant: AGC GLASS EUROPE, Louvain-la-Neuve (BE)

(72) Inventors: Claire Mattelet, Brussels (BE); Pierre Humblet, Ohain (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 23 days.

(21) Appl. No.: 15/745,303

(22) PCT Filed: Jul. 12, 2016

(86) PCT No.: PCT/EP2016/066496
§ 371 (c)(1),
(2) Date: Jan. 16, 2018

(87) PCT Pub. No.: WO2017/012912
PCT Pub. Date: Jan. 26, 2017

(65) Prior Publication Data
US 2018/0208494 A1 Jul. 26, 2018

(30) Foreign Application Priority Data
Jul. 17, 2015 (EP) .................................... 15177303

(51) Int. Cl.
| | | |
|---|---|---|
| *C03C 3/087* | (2006.01) | |
| *C03C 3/091* | (2006.01) | |
| *C03C 4/02* | (2006.01) | |
| *B32B 17/00* | (2006.01) | |
| *C03C 17/30* | (2006.01) | |
| *C03C 15/00* | (2006.01) | |
| *C03C 3/066* | (2006.01) | |
| *C03C 3/085* | (2006.01) | |
| *C03C 17/36* | (2006.01) | |
| *C03C 17/23* | (2006.01) | |
| *C03C 23/00* | (2006.01) | |
| *B32B 17/10* | (2006.01) | |
| *B60R 13/02* | (2006.01) | |

(52) U.S. Cl.
CPC .............. *C03C 3/087* (2013.01); *B32B 17/00* (2013.01); *B32B 17/10* (2013.01); *C03C 3/066* (2013.01); *C03C 3/085* (2013.01); *C03C 4/02* (2013.01); *C03C 15/00* (2013.01); *C03C 17/23* (2013.01); *C03C 17/30* (2013.01); *C03C 17/3657* (2013.01); *C03C 17/3668* (2013.01); *C03C 23/007* (2013.01); *B60R 13/02* (2013.01); *B60R 2013/0281* (2013.01)

(58) Field of Classification Search
CPC ......... C03C 3/085; C03C 3/097; C03C 3/091; C03C 3/083
See application file for complete search history.

(56) References Cited

U.S. PATENT DOCUMENTS

| | | | | |
|---|---|---|---|---|
| 8,730,553 | B2 * | 5/2014 | De Wind | ................. B60R 1/04 359/267 |
| 2002/0158853 | A1 * | 10/2002 | Sugawara | ................ G02B 6/10 345/176 |
| 2005/0031791 | A1 * | 2/2005 | Sasaki | .................. C09D 183/14 427/372.2 |
| 2011/0091704 | A1 * | 4/2011 | Akiba | ..................... C03C 3/087 428/220 |
| 2012/0133169 | A1 | 5/2012 | George et al. | |
| 2015/0045202 | A1 * | 2/2015 | Kondo | .................... C03C 3/095 501/64 |
| 2016/0152511 | A1 | 6/2016 | Lambricht et al. | |
| 2016/0364111 | A1 * | 12/2016 | Piekny | .................. G06F 3/0488 |
| 2017/0349473 | A1 * | 12/2017 | Moriya | .................. C03B 23/03 |

FOREIGN PATENT DOCUMENTS

| | | | | |
|---|---|---|---|---|
| WO | WO 2010/081142 A1 | 7/2010 | | |
| WO | WO-2010081156 A1 * | 7/2010 | ......... | B60R 11/0264 |
| WO | WO-2013162030 A1 * | 10/2013 | ............ | C03C 3/095 |
| WO | WO 2015/011044 A1 | 1/2015 | | |

OTHER PUBLICATIONS

International Search Report dated Sep. 13, 2016 in PCT/EP2016/066496 filed on Jul. 12, 2016.

* cited by examiner

*Primary Examiner* — Elizabeth A. Bolden

(74) *Attorney, Agent, or Firm* — Oblon, McClelland, Maier & Neustadt, L.L.P.

(57) ABSTRACT

The invention relates to a trim element for interior vehicle. According to the invention, the trim element is made of glass sheet.

19 Claims, 1 Drawing Sheet

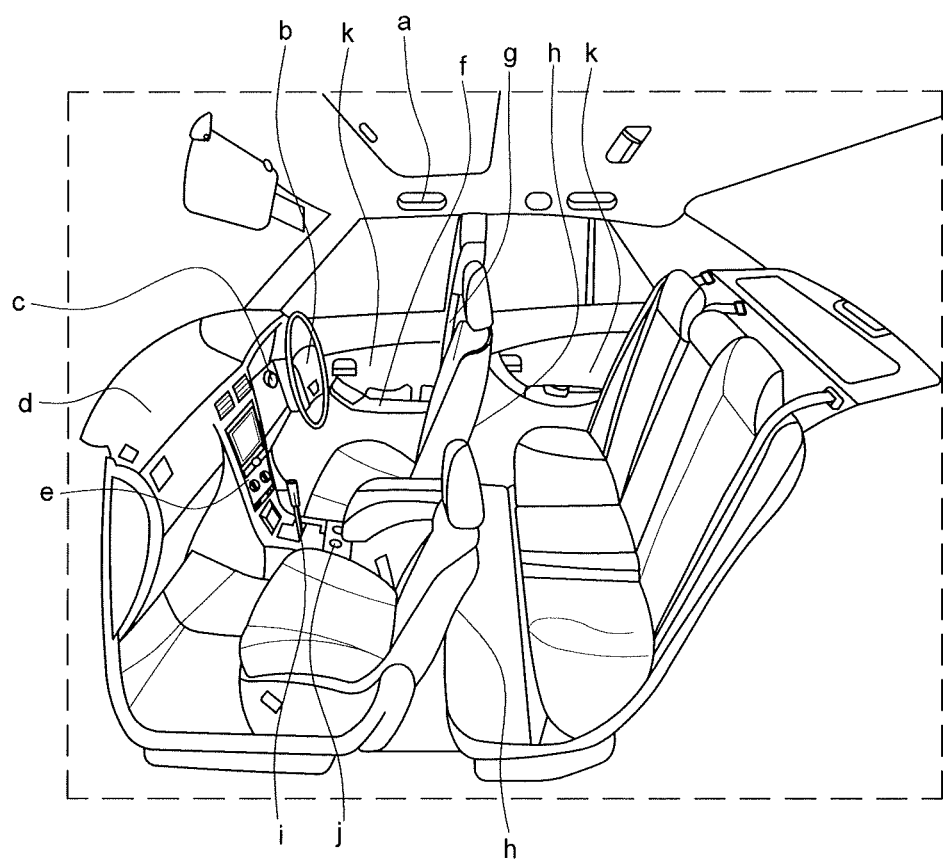

TRIM ELEMENT FOR INTERIOR VEHICLE

The present invention relates to a glass trim element for vehicle interior.

Interior trim vehicle refers to the items that can be added to the interior of an automobile to increase its appeal. There are several types of car trim. Some are used to protect some part of the interior vehicle from unwanted damage that can be caused by the passenger, while others are simply for aesthetics.

Today, consumers want to have the opportunity to choose his interior vehicle to customize it. The consumer wants to be able to purchase several styles of vehicle trim placed in different parts of the interior vehicle, the most popular trim element being chrome. Some others trims element are available in the market. For example, pinstriping can be used. The pinstriping is a special plastic tape on a removable backing that is applied on several areas of a vehicle. Pinstriping usually consists of thin stripes, plain or designed, like barbed wire, that run lengthwise from the front of the fender to the rear of the quarter panel on both sides.

However, in many interior vehicles, plastic trims are disposed to cover unaesthetic part of the interior vehicle. For example, in order to make the interior of the car more beautiful and comfortable, usually decorated plastic panels covering the exposed parts of the interior vehicle are mounted.

Generally, the interior trim element is made of vinyl, artificial leather, wood grain, and leather, or more generally made of plastics, polycarbonate elements. This solution is often aesthetic but does not allow adding directly some functions on the trim as such "touch screen functionalities" . . . . Furthermore, the disadvantages of having a plastics molded or leather . . . are the following: since there is no touch functionality permitted with plastics or others classically used material, an overload of useless buttons must be installed on the trim. At the end of the day, the multitude of buttons confuses the driver (safety aspect). Additionally, because there is no seamless effect, it is more difficult to clean the center console as the dust is incrusted around the buttons, etc. (hygiene downside). Furthermore, the plastic material or others classically used material used to cover some part of the vehicle interior is hardly recyclable whereas glass is endlessly recyclable (environmental issue). The molding process of the plastic parts results in plastics ending up as wastes (recyclable plastics prices are not competitive with newer plastics prices, therefore there is currently no viable alternative to address this environmental concern). In general, plastics material used a glass cover are not highly resistant to UV and the transparent tint turns into yellow with time (deterioration of the design). Additionally, in order to present a similar stiffness than glass, a cover made of plastics will be heavier than one made of glass. Therefore, plastics material solutions are not optimal for this car part in order to lighten the car. As technology cycles go faster and faster, a trim element would allow flexibility for IT upgrades to be made and allows for seamless connectivity with nomadic devices. By having a trim glass to covering some part of vehicle interior, it would allow to reconcile the many different softwares that are typically supported by the car into one Operating System (OS) located and commanded from the same place. Additionally, in contrast to most of the materials currently used as parts of the trim element, glass can support the use of ambient light (improving the comfort/convenience of the passengers). Furthermore, the passenger does not want to see anymore plastic in his interior's car similarly to his house or his interior's office.

Furthermore, the trim element of the prior art are rather sensitive to scratches and not really aesthetic.

In view of the foregoing prior art problems, it is an object of the present invention to provide an improved trim element for interior vehicle with a good aesthetic and more resistant to scratches than trim element of the prior art.

According to the invention, the at least one trim element is made of glass sheet.

According to the invention, the trim element is mounted on any part in the interior vehicle to be covered in order to provide a better aesthetic or to secure some part of the interior vehicle. Generally, the trim element covers some parts of the interior vehicle as trim for doors handles contours, door panels, trim elements for the dashboard, back of seats . . . .

According to an embodiment of the invention, the functional parts may be directly managed from the trim element thanks to "touch function" providing a touch panel. Thus, the trims elements made of glass sheet may host different functionalities around electronic gadgetry and vehicle control information, connectivity, touch, display and audio.

According to another embodiment, the trim element may be curved for improved ergonomics conditions of drivers/passengers (view adaptation and glare related issues). Cavities on trim element can be processed to provide haptic feedback on a plain glass sheet for easy detection of touch sensors (for safety reason of the driver).

In a preferred embodiment of the invention, the trim element is made of in one piece of glass sheet extended along the part to be covered.

According to another embodiment of the invention, the trim element can be made of several pieces of glass sheet, depending on the needs for harbouring functions.

According to another embodiment of the invention, some lighting means as for example OLED, LED, special glass paint/enamel backing, may be integrated into the trim element or on its edges.

According to one embodiment of the invention, the trim element may be glued or fixed to the part of the interior vehicle to be covered.

According to the invention, the center console is made of flat glass sheet which can be bended or thermoformed to adapt with the shape of the car. The flat glass sheet may be processed to be decorative or in order to give an access to buttons, cigarette lighter or auxiliary power point, audio controls, the climate control/air condition system and possibly a display screen (or other type of system requiring a hole drilled in the glass sheet surface).

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

In one nonlimiting embodiment, the basic composition of the glass according to the invention comprises, in a content expressed as percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In another embodiment, the basic composition of the glass according to the invention comprises, in a content expressed as percentages by total weight of glass:

| | |
|---|---|
| SiO$_2$ | 55-78% |
| Al$_2$O$_3$ | 0-18% |
| B$_2$O$_3$ | 0-18% |
| Na$_2$O | 0-20% |
| CaO | 0-15% |
| MgO | 0-10% |
| K$_2$O | 0-10% |
| BaO | 0-5% |

In another embodiment and for reasons of lower costs, the glass is a a soda-lime glass. Advantageously, the basic composition of the glass according to the invention comprises, in a content expressed as percentages by total weight of glass:

| | |
|---|---|
| SiO$_2$ | 60-75% |
| Al$_2$O$_3$ | 0-6% |
| B$_2$O$_3$ | 0-4% |
| CaO | 0-15% |
| MgO | 0-10% |
| Na$_2$O | 5-20% |
| K$_2$O | 0-10% |
| BaO | 0-5%. |

According to an advantageous embodiment of the invention, the composition of the glass sheet may additionally comprise one or more component (s)/colorant(s) in an appropriate amount as a function of the effect desired. This/these component (s)/colorant(s) may be used, for example, to "neutralize" the colour generated by for example the presence of the chromium and thus to render the colouring of the glass of the invention more neutral or colourless. Alternatively, this/these colorant(s) may be used to obtain a desired colour other than that which can be generated by for example the presence of the chromium.

In a preferred embodiment of the present invention, and particularly when touch functions are expected on the glass sheet of the center console, the glass sheet preferably has special enhanced infrared transmission properties in order to enhance the performances of the glass. By virtue of its high transmission of infrared radiation, a such glass sheet may advantageously be used in a touchscreen or touch panel or touchpad using the Planar Scatter Detection (PSD) or Frustrated Total Internal Reflection (FTIR) optical technology to detect the position of one or more objects (for example a finger or a stylus) on a surface of the said sheet. Thus, a solution proposed in the present invention to provide a glass with a high reflection in infrareds (RIR) consists of integrating in the glass composition chromium in a specific range contents.

Thus, according to one embodiment of the present invention, the glass sheet preferably has a composition which comprises a content expressed as percentages by total weight of glass:

| | |
|---|---|
| Total Iron (expressed in the form of Fe$_2$O$_3$) | 0.002-0.06% |
| Cr$_2$O$_3$ | 0.0001-0.06%. |

Such glass compositions combining low content of iron and chromium have shown some particularly good performances in terms of infrared reflection (RIR) and show a high transparency in the visible. These compositions are described for example in the following documents: WO2014128016A1, WO2014180679A1, WO2015011040A1, WO2015011041A1, WO2015011042A1, WO2015011043A1 and WO2015011044A1.

According to another embodiment of the present invention, the glass sheet has a composition which comprises:

| | |
|---|---|
| Total Iron (expressed in the form of Fe$_2$O$_3$) | 0.002-0.06% |
| Cr$_2$O$_3$ | 0.0015-1% |
| Co | 0.0001-1%. |

Such chromium and cobalt based glass compositions have shown particularly good performances in terms of infrared reflection RIR while offering interesting possibilities in terms of aesthetics/color (from blue to intense coloration neutrality or up opacity). Such compositions are described in European patent application No. 13 198 454.4.

According to another embodiment of the present invention, the glass sheet has a composition which comprises a content expressed as percentages by total weight of glass:

| | |
|---|---|
| Total iron (expressed in the form of Fe$_2$O$_3$) | 0.02-1% |
| Cr$_2$O$_3$ | 0.002-0.5% |
| Co | 0.0001-0.5%. |

Preferably, in this embodiment, the composition comprises 0.06%<total iron≤1%.

Such compositions based on chromium and cobalt are used to obtain colored glass sheets in the blue-green range, comparable in terms of color and light transmission with blue and green glasses on the market, but with performance particularly good in terms of infrared reflection. Such compositions are described in European patent application EP15172780.7.

According to another embodiment of the present invention, the glass sheet has a composition which comprises a content expressed as percentages by total weight of glass:

| | |
|---|---|
| total iron (expressed in the form of Fe$_2$O$_3$) | 0.002-1% |
| Cr$_2$O$_3$ | 0.001-0.5% |
| Co | 0.0001-0.5% |
| Se | 0.0003-0.5%. |

Such glass compositions based on chromium, cobalt and selenium have shown particularly good performances in terms of infrared reflection while offering interesting possibilities in terms of aesthetics/color (gray neutral to slight staining intense in the gray-bronze range). Such compositions are described in European patent application EP15172779.9.

According to another embodiment of the invention, the composition of the glass sheet comprises the following in weight percentage, expressed with respect to the total weight of glass:

65≤SiO$_2$≤78%
5≤Na$_2$O≤20%
0≤K$_2$O<5%
1≤Al$_2$O$_3$<6%
0≤CaO<4.5%
4≤MgO≤12%;
as well as a (MgO/(MgO+CaO)) ratio ≥0.5.

In another embodiment of the invention, the composition of the glass sheet comprises the following in weight percentage, expressed with respect to the total weight of glass:

$65 \leq SiO_2 \leq 78\%$
$5 \leq Na_2O \leq 20\%$
$1 \leq K_2O < 8\%$
$1 \leq Al_2O_3 < 6\%$
$2 \leq CaO < 10\%$
$0 \leq MgO \leq 8\%$;
a $K_2O/(K_2O+Na_2O)$ ratio of from 0.1 to 0.7.

Some others composition of glass may be used, such compositions are for example described in the following documents: EP14 167 942.3, EP14 177 487.7.

According to another advantageous embodiment of the invention, which may be combined with the preceding embodiment, the glass sheet can be coated with a layer or a film which makes it possible to modify or neutralize the colour which may be generated by for example the presence of the chromium (for example a coloured PVB film).

The glass sheet according to the invention may advantageously be chemically or thermally tempered in order to avoid scratches and to enhance the resistivity of the upper part of the center console.

According to one embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. A textured glass sheet may be also used to limit the reflection inside the vehicle. Etching or coating techniques may as well be used in order to avoid reflection.

According to another embodiment, the glass sheet is coated with at least one anti-fingerprint layer or has been treated so as to reduce or prevent fingerprints. This embodiment is also advantageous in the case of use of the glass sheet of the invention as front face of a touchscreen. Such a layer or such a treatment may be combined with a transparent and electrically conducting thin layer deposited on the opposite face. Such a layer may be combined with an antireflection layer deposited on the same face, the anti-fingerprint layer being on the outside of the stack and thus covering the antireflection layer.

According to the applications and/or properties desired, other layers can be deposited on one and/or the other face of the glass sheet according to the invention.

The glass sheet according to the invention may be a glass sheet obtained by a floating process, a drawing process, a rolling process or any other process known to manufacture a glass sheet starting from a molten glass composition. According to a preferential embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have a thickness varying between 0.1 and 25 mm. Advantageously, in the case of the application of touch panels, the glass sheet according to the invention can have a thickness varying between 0.1 and 6 mm. Preferably, in the case of the touch screens application, for reasons of weight, the thickness of the glass sheet according to the invention is from 0.1 to 2.2 mm.

According to the invention, the glass sheet presents a curvature to correctly fit with the particular design of the interior vehicle, doors, dashboard . . . .

In order to provide a better esthetic of the interior vehicle, the trim element may be made of a digital or silk screen printed glass sheet, an etched glass sheet, a painted/enameled glass sheet, a casted glass sheet, an anti-bacterial glass sheet, a colored float glass sheet.

According to another embodiment of the invention, the trim element are made of laminated glass sheet. According to this embodiment, at least one thermoplastic interlayer is used to laminate at least two glass sheets. Advantageously, a colored or active interlayer may be present between the at least two glass sheets. The interlayer or a layer between the glass and the interlayer might have a low refractive index (<1.43, <1.4, <1.38, . . . <1.3) to ensure TIR in the upper glass, if compatible from IR absorption point of view.

According to another embodiment of the invention, the at least one trim element is made of heat treated glass sheet, for example annealed or tempered and/or bended glass sheet. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

Thus, a trim element made of glass sheet according to the invention may provide a trim having one or more of the following advantages:
 a higher mechanical/scratch resistance
 an improved stiffness/weight ratio
 a higher resistance to ageing/weathering (sun irradiation)
 possibility to provide a better finishing/aspect
 possibility to have a transparent trim element (for back lighting, screen integration, . . . )
 possibility to have a glare control treatment and/or anti-finger prints coating
 a better recyclability
 a seamless connectivity with nomadic devices
 the glass trim element can harbor seamless audio functions (audioglass)
 a better hygienic aspect
 a better comfort/convenience
 some functionalities may be tailor-made for the occupant
 possibility of reconciliation of many different softwares into one single place for one Operating System.

The following FIG. 1 illustrates some parts of the interior vehicle where a trim element according to the invention may be provided, without the intention of in any way limiting its coverage.

For example, a glass trim element may be provided:
 a. around the assist grip
 b. as an air bag cover,
 c. as a key cylinder bezel
 d. as a dashboard covering
 e. as a control panel switch
 f. as an armrest cover
 g. as a pillar lower cover, h. as a seat back board
i. as a shift grip
j. as a cup holder cushion
k. as a door cover It is understood that the different trim element provided in different parts of the interior vehicle may be made of the same glass or may be different to answer to different specifications requested by the car maker. For example, the trim element provided as an armrest cover or doors handles contours may be different from the door panels or trim element of the dashboard, back of seats . . . . For example, the trim used as an armrest cover may be made of colored glass and the trim provided as a door panel or back seats may be a touch panel wherein some functionalities are provided.

According to the invention, the glass trim element may be glued, screwed or fixed by any suitable method to the interior vehicle.

The invention claimed is:

1. A trim element for a vehicle interior, wherein the trim element is made of glass sheet,
wherein the glass comprises, in a content expressed as percentages by total weight of glass:

| | |
|---|---|
| $SiO_2$ | 55-85%; |
| $Al_2O_3$ | 0-30%; |
| $B_2O_3$ | 0-20%; |
| $Na_2O$ | 0-25%; |
| CaO | 0-20%; |
| MgO | 0-15%; |
| $K_2O$ | 0-20%; |
| BaO | 0-20%; | as well as a (MgO/(MgO+CaO)) ratio≥0.5, and
wherein the glass comprises, in a content expressed as percentages by total weight of glass:
Total iron (expressed in the form of $Fe_2O_3$) 0.002-0.06%; and
$Cr_2O_2$ 0.0001-0.06%.

2. The trim element according to claim 1, wherein the glass is a glass of soda-lime-silica, aluminosilicate or borosilicate type.

3. A trim element according to claim 1, further comprising functional elements which are integrated into the trim element.

4. A trim element according to claim 1, wherein the trim element comprises touch functionalities.

5. A trim element according to claim 1, wherein the trim is provided as a door cover and is a touch panel.

6. A trim element according to claim 1, wherein the trim element is provided as armrest cover.

7. A trim element according to claim 1, wherein an opening is provided on the trim element.

8. A trim element according to claim 1, wherein the trim element is made of a laminated glass and/or tempered glass.

9. A trim element according to claim 1, wherein the trim element is bent.

10. A trim element according to claim 1, wherein the trim element is made of a coated glass.

11. A trim element according to claim 1, wherein the trim element comprises flat and curved parts.

12. A trim element according to claim 1, wherein the trim element has a thickness between 0.2 to 6 mm.

13. A vehicle comprising a trim element according to claim 1.

14. A trim element according to claim 1, comprising an antireflection layer comprising porous silica.

15. A trim element according to claim 1, comprising an antireflection layer comprising a stack of layers of dielectric material having alternating low and high refractive indexes and terminating in a layer having a low refractive index.

16. A trim element according to claim 1, wherein the glass sheet is further (i) provided with an antireflection layer, (ii) textured to limit reflection, (iii) etched to reduce reflection, or (iv) coated to reduce reflection.

17. A trim element according to claim 1, wherein the trim element comprises a touch panel.

18. A trim element according to claim 1, wherein the trim element does not comprise a touch panel or a display.

19. A trim element for a vehicle interior, wherein the trim element is made of glass sheet,
wherein the glass comprises, in a content expressed as percentages by total weight of glass:
$65 \leq SiO_2 \leq 78\%$;
$5 \leq Na_2O \leq 20\%$;
$0 \leq K_2O \leq 5\%$;
$1 \leq Al_2O_3 \leq 6\%$;
$0 \leq CaO < 4.5\%$;
$4 \leq MgO \leq 12\%$;
as well as a (MgO/(MgO+CaO)) ratio ≥0.5; and
wherein the glass comprises, in a content expressed as percentages by total weight of glass;
Total iron (expressed in the form of $Fe_2O_3$) 0.002-0.06%; and
$Cr_2O_3$ 0.0001-0.06%.

* * * * *